Sept. 1, 1964  C. O. BROWN  3,146,817
SET SCREW HAVING RADIALLY MOVABLE LOCKING SECTION
Filed March 30, 1960  2 Sheets-Sheet 1

INVENTOR.
CALVIN O. BROWN
BY
Prangley, Baird, Clayton, Miller & Vogel
Attys.

Sept. 1, 1964 C. O. BROWN 3,146,817
SET SCREW HAVING RADIALLY MOVABLE LOCKING SECTION
Filed March 30, 1960 2 Sheets-Sheet 2
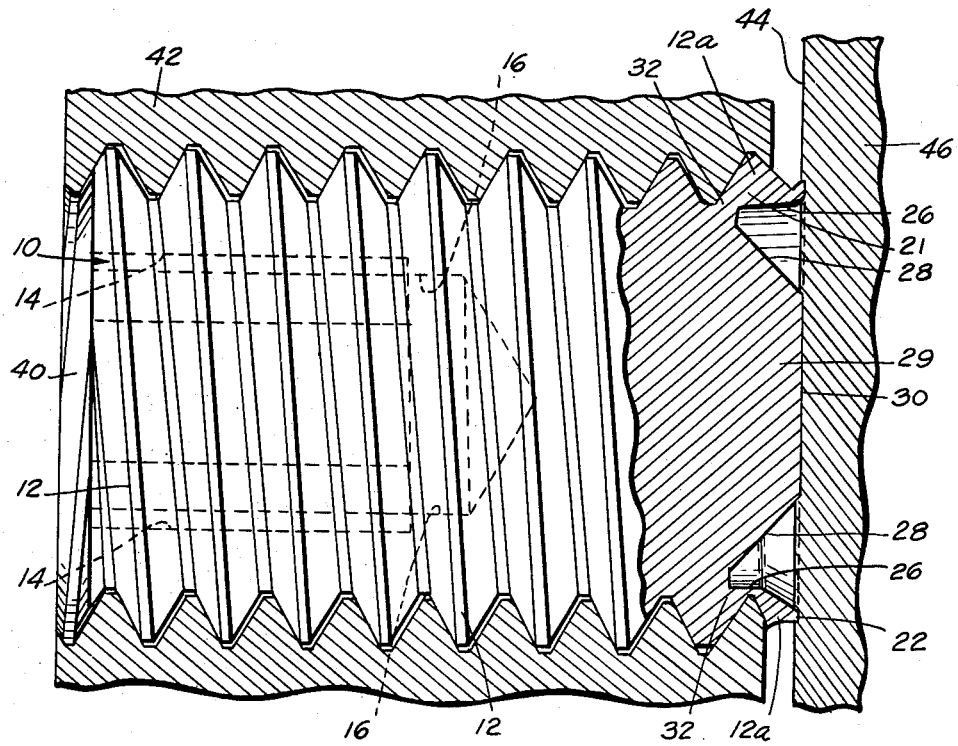
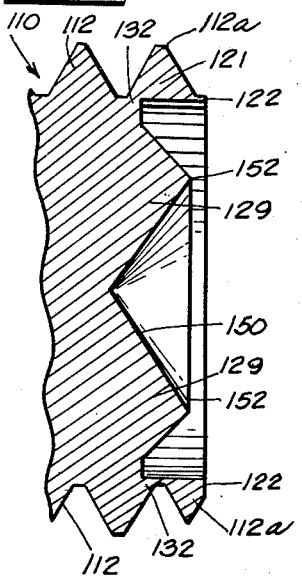
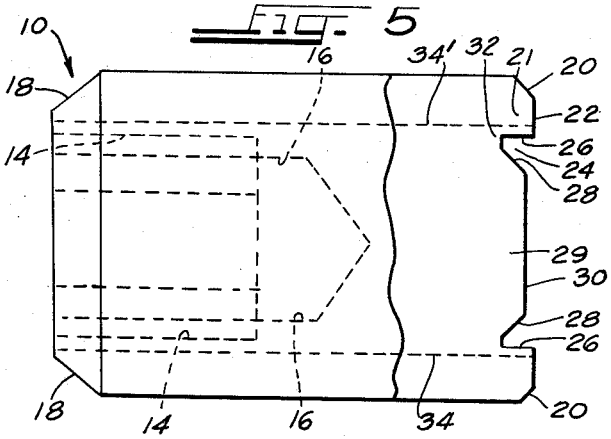
INVENTOR.
CALVIN O. BROWN United States Patent Office 3,146,817
Patented Sept. 1, 1964

3,146,817
SET SCREW HAVING RADIALLY MOVABLE
LOCKING SECTION
Calvin O. Brown, Bartlett, Ill., assignor to Set Screw &
Mfg. Company, Bartlett, Ill., a corporation of Illinois
Filed Mar. 30, 1960, Ser. No. 18,534
4 Claims. (Cl. 151—22)

This invention relates to set screws, and particularly to self-locking set screws.

Various structures have been provided heretofore to hold a set screw in operative position wherein the set screw is disposed in a threaded aperture in a first workpiece and the point of the set screw bears against the surface of a second workpiece to hold the first and second workpieces substantially immovable with respect to each other. In certain of the arrangements used heretofore the point of the set screw was shaped in a particular manner so that it cut into or otherwise deformed the second workpiece thereby to hold the set screw in a fixed and immovable position with respect to the two workpieces. In other arrangements, the set screw was provided with structure to hold it immovable with respect to the first threaded workpiece by an interengagement between the threads. In yet other locking arrangements utilized heretofore, special accessories have been provided either on the set screw or on the workpieces to hold the set screw immovable with respect thereto. Each of the above arrangements has certain disadvantages inherent in the use thereof in that either one or both of the workpieces is marred or injured or the set screw itself is deformed in a manner such that it cannot be readily removed or if capable of being removed cannot be used again.

It is an important object of the present invention to provide an improved set screw which is self-locking whereby it is held immovable with respect to the associated workpieces.

Another object of the invention is to provide an improved self-locking set screw of the type set forth in which the set screw can be readily removed from the aperture in the associated workpiece without injury to either of the associated workpieces or the set screw.

Yet another object of the invention is to provide an improved self-locking set screw of the type set forth in which neither the workpieces associated therewith nor the set screw is permanently injured, marred or deformed in order to achieve satisfactory locking action.

Still another object of the invention is to provide an improved self-locking set screw of the type set forth which can be re-used a plurality of times and still provide satisfactory locking action without injury either to the associated workpieces or to the set screw.

These and other objects and advantages of the invention will be better understood from the following description when taken in conjunction with the accompanying drawings. In the drawings wherein like reference numerals have been utilized to designate like parts throughout:

FIG. 3 is a fragmentary view with certain parts in cross section showing the set screw of FIGS. 1 and 2 in operative association with two workpieces to hold the workpieces fixed with respect to each other, the set screw being shown in the locking position;

FIG. 4 is a fragmentary view in vertical section through a set screw made in accordance with and embodying the principles of the present invention and showing a modified workpiece engaging point therefor; and FIG. 5 is a diagrammatic view illustrating the construction of the set screw of FIGS. 1 through 3 of the drawings.

Figure 1:
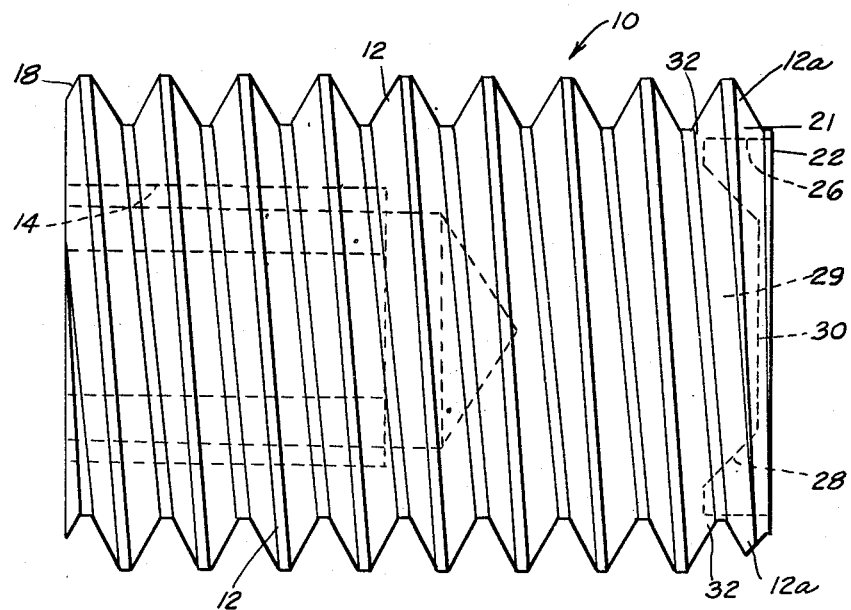
FIGURE 1 is an enlarged side elevational view of an improved self-locking set screw made in accordance with and embodying the principles of the present invention, one preferred form of workpiece engaging point being shown illustrated thereon.
Figure 2:
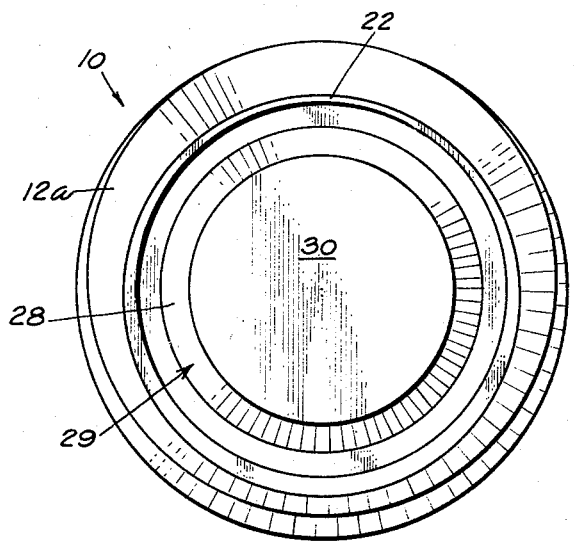
FIG. 2 is a plan view of the workpiece engaging end of the self-locking set screw illustrated in FIG. 1 of the drawings.

There is shown in FIGS. 1 and 2 of the drawings a first preferred embodiment of a self-locking set screw made in accordance with and embodying the principles of the present invention, the set screw being generally designated by the numeral 10. The set screw 10 has been illustrated as being of the headless type although it is to be understood that the invention is equally applicable to studs, plugs, adjusting screws, and the like. The set screw 10 is drawn on a substantially enlarged scale but is illustrative of a standard set screw having a screw number or nominal size of ¼–20 NC, Class 2 fit, ⅜″ long. The dimensions for such a screw are standardized in the industry and acceptable tolerances for the dimensions of this and other set screws are set forth in Screw Thread Standards for Federal Services, 1944, Handbook H28 (1944), U.S. Dept. of Commerce, National Bureau of Standards, the 1950 Supplement thereto and Screw-Thread Standards for Federal Services, 1957, Handbook H28 (1957), Part I, U.S. Department of Commerce, National Bureau of Standards. According to those standards, the set screw 10 has an allowable thread crest or major diameter within the range 0.2428″ minimum to 0.2500″ maximum, a minor diameter of 0.1887″ maximum, and a pitch diameter of 0.2139″ minimum to 0.2175″ maximum.

Referring now also to FIG. 5 of the drawings, the dimensions for the set screw 10 of an actual production example will be given. The major diameter is that set forth above but is preferably held to within the range 0.2440″ minimum to 0.2500″ maximum. The pitch diameter is held within the allowable tolerances and the over-all length is 0.375″±0.010″. There is formed on the body of the set screw 10 and extending throughout the length thereof a thread 12, the thread 12 having the usual standard configuration although it is to be understood that other than standard threads may be used if desired without departing from the present invention.

The left hand end of the set screw 10 as viewed in FIGS. 1 and 5 is provided with a recess for engagement by a torque applying tool to effect rotation of the screw about its longitudinal axis, the recess being in the form of a hexagonal socket 14. The socket 14 is formed by drilling a hole 16 having a diameter between 0.123″ minimum and 0.126″ maximum to a depth of about ¼″ and concentric with the body of the set screw 10. The hexagonal wrench-receiving socket 14 is then formed and is provided with dimensions such that the width across the flats thereof is within the range 0.125″ minimum to 0.127″ maximum, the depth of the socket being about ⁵⁄₃₂″.

As was stated above, the thread 12 extends substantially to both ends of the body of the set screw 10, the thread 12 in fact extending the full length of the set screw 10 except for the presence of two chamfers 18 and 20 thereon. The chamfer 18 is provided on the socket end of the set screw 10 and is a 0.037″ x 37½° chamfer and the chamfer 20 is a 45° chamfer.

The right hand end of the set screw 10 as viewed in FIGS. 1 and 5 is adapted to engage a work piece. A locking portion or section 21 having a first substantially flat work piece engaging surface 22 is provided, the surface 22 lying in a plane substantially perpendicular to the longitudinal axis of the set screw 10. Formed in the face of the end of the set screw 10 is an annular recess or groove 24 which is defined by a first cylindrical wall 26 that is concentric with the body of the set screw 10 and a second inclined and frusto-conical wall 28 which is formed at a 45° angle with respect to the longitudinal axis of the set screw 10 and with respect to the cylindrical wall 26. The frusto-conical wall 28 surrounds and defines an abutment portion or section 29 having a second work piece engaging surface 30 which is substantially flat and circular in shape and is concentric with the body of set screw 10. The work engaging surface 22 extends beyond the work engaging surface 30 whereby the work engaging surface 22 first contacts the associated work piece whereby to move the locking portion 21 radially outwardly as the second work piece engaging surface 30 moves into engagement with the associated work piece. More particularly, the portion 21 is connected to the body of the set screw 10 by a deformable connecting portion 32 to permit movement of the portion 21 radially outwardly, all as will be described more fully hereafter.

The cylindrical wall 26 in the set screw 10 may have a diameter between 0.160" minimum to 0.170" maximum in one preferred form, and the external or outer diameter of the work piece engaging surface 22 is from 0.210" minimum to 0.220" maximum whereby to define an annular surface comprising the work piece engaging surface 22. The second work piece engaging surface 30 has a diameter of from 0.118" minimum to 0.132" maximum. The depth of the annular groove 24 and consequently the longitudinal extent of the wall 26 is about 1/32" in the form of the set screw illustrated in the drawings. The first work piece engaging surface 22 is disposed about 0.008" beyond the second work piece engaging surface 30.

Referring to FIG. 3 of the drawings, the set screw 10 is shown in operative engagement in the aperture 40 of a first work piece 42 and bearing against the surface 44 of a second associated work piece 46. When first inserting the set screw 10 into the aperture 40, the surface 22 is in advance of the surface 30 and that portion of the thread 12 which is associated with the locking member 21 (designated by the numeral 12a in the drawings) has not yet been deformed. The bearing surface 22 first reaches the work piece surface 44 and continued rotation of the set screw 10 by means of a tool engaging the socket 14 causes the locking member 21 to be deformed outwardly by bending at the connecting portion 32. Continued turning of the set screw 10 eventually will place the engaging surface 30 against the work piece surface 44, the locking member 21 being continually deformed radially and outwardly until movement of the set screw is arrested by firm contact of the surface 30 of the abutment member 29 against the surface 44. The longitudinal distance between the surfaces 22 and 30 is carefully selected so that the metal forming the connecting portion 32 is not stressed beyond the yield point thereof. Accordingly, it will be seen that the cross section of the connecting member 32 will depend upon the geometry of the work piece engaging point of the set screw and the material of construction of the set screw 10. In the particular example illustrated in the drawings, the material used is rolled 4140 steel which is heat treated after forming.

The urging of the locking member 21 outwardly by deforming the connecting portion 32 serves to clamp the set screw to the work piece 42 and against the work piece 44. The degree of locking obtained can be adjusted in accordance with the torque which it is desired to be utilized in setting the set screw 10 in final operative position. In general, the higher the setting torque desired, the thicker is the connecting portion 32, and vice versa, the lower setting torque, the thinner is the cross section of the connecting portion 32, but in no event can the thickness of the connecting member 32 be negligible, i.e., the diameter of the annular wall 26 cannot be greater than the minor diameter of the set screw which is indicated as the distance between the dashed lines 34 and 34' in FIG. 5.

From the above it will be seen that the desired degree of locking which is correlated to the desired setting torque for the set screw 10 can be adjusted by changing the cross section of the connecting portion 32 and by varying the distance between the surfaces 22 and 30 for any given material of construction for the set screw 10. The distance between the bearing surfaces 22 and 30 is always such that the bearing surface 30 of the abutment member 29 acts as a stop to insure that the material in the engaging portion 21 and in the connecting member 32 is not stressed beyond the yield point thereof.

The set screw 10 can be removed by imparting a reverse or retrograde direction of rotation by means of a tool inserted in the socket 14. Since the material in the locking member 21 and in the connecting portion 32 is not stressed beyond the yield point thereof, these parts will tend to return to their original form as illustrated in FIG. 1 of the drawings as soon as the set screw 10 is moved a slight distance to the left as viewed in FIG. 3. After the locking member 21 and the connecting portion 32 have returned to their normal unstressed shape, the set screw 10 can be readily removed from the aperture 40 in the usual manner.

An inspection of the work pieces 42 and 46 after application and removal of the set screw 10 reveals that there is no marring or distortion of the surfaces thereof. Furthermore, the set screw 10 has not been marred or deformed permanently and in fact can be applied and removed a substantial number of times.

There is shown in FIG. 4 of the drawings a second preferred form of the set screw. Since many portions of the set screw of FIG. 4 are identical with the set screw 10 described above, like numbers beginning with 110 for the set screw itself have been applied to like parts. The set screw of FIG. 4 differs essentially from that of FIGS. 1 through 3 in that the abutment member 129 instead of having the outer end thereof formed flat as was the engaging portion 29 is provided with a cup point formed by a conical recess defined by a conical wall 150 which is concentric with the body of the set screw 110. The cup point formation of the abutment member 129 increases the holding power thereof in certain cases whereby to get even a more firm locking action as compared to that obtained with the set screw 10. Otherwise the action and method of applying and withdrawing the set screw 110 is identical with that of applying and withdrawing the set screw 10. More particularly, the locking member 121 is deformed outwardly by deforming the connecting portion 132 until the outer edge 152 of the cup point on the abutment member 129 abuts against the associated work piece, the distance between the surface 122 and the point edge being such as to insure that the material in the locking member 121 and the connecting portion 132 does not exceed the yield limit thereof.

It will be seen that there has been provided a self-locking set screw which satisfies all of the objects set forth above and which possesses the important advantages of being self-locking without injury either to the associated work pieces or to the set screw and which can be readily removed and re-used a substantial number of times. Although two preferred forms of the invention have been illustrated and described, it is to be understood that various changes and modifications can be made therein without departing from the spirit and scope of the invention. Accordingly, the invention is to be limited only as set forth in the following claims.

I claim:

1. An integral one-piece self-locking set screw for interlocking a first workpiece having an internally threaded bore receiving said set screw therein to a second workpiece positioned near the associated end of the bore, said set screw comprising a substantially cylindrical body having a longitudinal axis, one end of said body being formed for engagement by a torque applying tool for effecting rotation of said screw about said longitudinal axis, the other end of said body having an annular groove therein substantially concentric about said longitudinal axis, an inner wall of said annular groove defining a central abutment section of limited axial extent for clampingly engaging with the second workpiece, the outer wall of said annular groove defining an annular outer locking section for clampingly engaging with both the first and second workpieces, a plurality of turns of thread on said body about the longitudinal axis thereof and extending to said other end thereof, said outer wall of said annular groove and said thread turns adjacent thereto providing a connecting portion joining said outer locking section to said body and being relatively thin radially for permitting radial deflection and return of said outer locking section, the radial distance between said longitudinal axis and the outer end of said annular groove being at least as great as the radial distance between said longitudinal axis and the inner end of said annular groove for ensuring outward radial deflection of said outer locking section upon engagement thereof with the second workpiece, said outer locking section extending in an axial direction a predetermined distance beyond said central abutment section for engaging the second workpiece in advance of the engagement of the second workpiece by said central abutment section to ensure outward radial deflection of said outer locking section, the engagement of said central abutment section with the second workpiece limiting the radial outward and axial deflection of said outer locking section, whereby said central abutment section interlocks said set screw with the second workpiece and the outward radial and axial deflection of said outer locking section interlocks said set screw with the threaded bore of the first workpiece.

2. The integral one-piece self-locking set screw set forth in claim 1, wherein the longitudinal distance between the outer end of said outer locking section and the outer end of said central abutment section is such that the movement thereof into substantial longitudinal alignment by the outward radial movement of said locking section from the non-locking position to the locking position thereof imposes a stress upon said connecting portion below the yield point of the material thereof, whereby said set screw may be withdrawn and reapplied to the first and second workpieces a plurality of times.

3. The integral one-piece self-locking set screw set forth in claim 1, wherein the outer surface of said central abutment section is substantially flat in a directon transverse to the longitudinal axis of said set screw.

4. The integral one-piece self-locking set screw set forth in claim 1, wherein the outer end of said central abutment section is provided with a cup-point for clamping engagement with the second workpiece.

References Cited in the file of this patent

UNITED STATES PATENTS

| | | |
|---|---|---|
| 2,533,748 | Weissert | Dec. 12, 1950 |
| 2,770,276 | Broder | Nov. 13, 1956 |
| 2,907,245 | Whitson | Oct. 6, 1959 |

FOREIGN PATENTS

| | | |
|---|---|---|
| 154,948 | Australia | Jan. 28, 1954 |